Nov. 22, 1966    J. E. ZUPANICK ET AL    3,287,724
OBSTACLE CLEARANCE SYSTEM FOR AIRCRAFT
Filed Oct. 24, 1957                      2 Sheets-Sheet 1
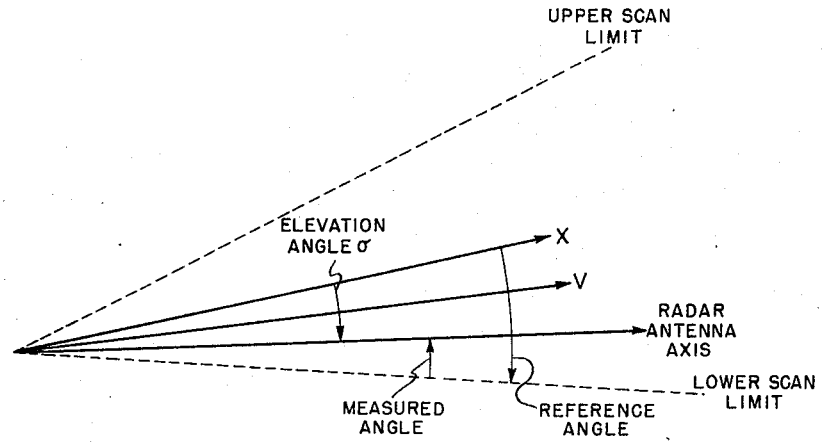
Fig. 1
Fig. 2
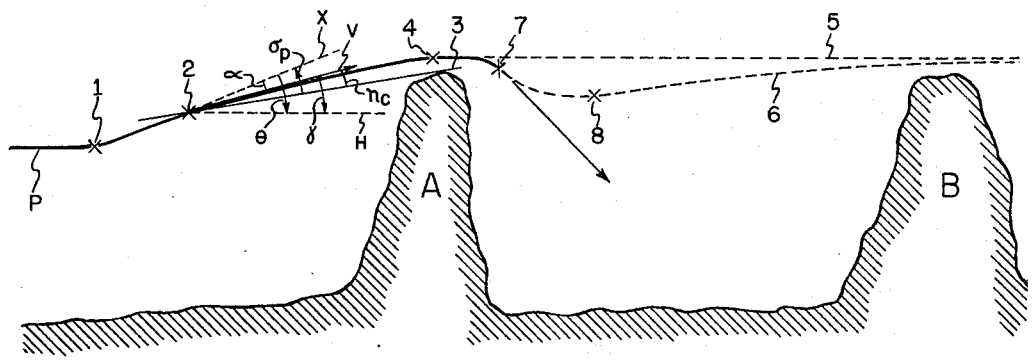
INVENTORS
JOSEPH E. ZUPANICK
DONAL R. TREFFEISEN
BY
ATTORNEY

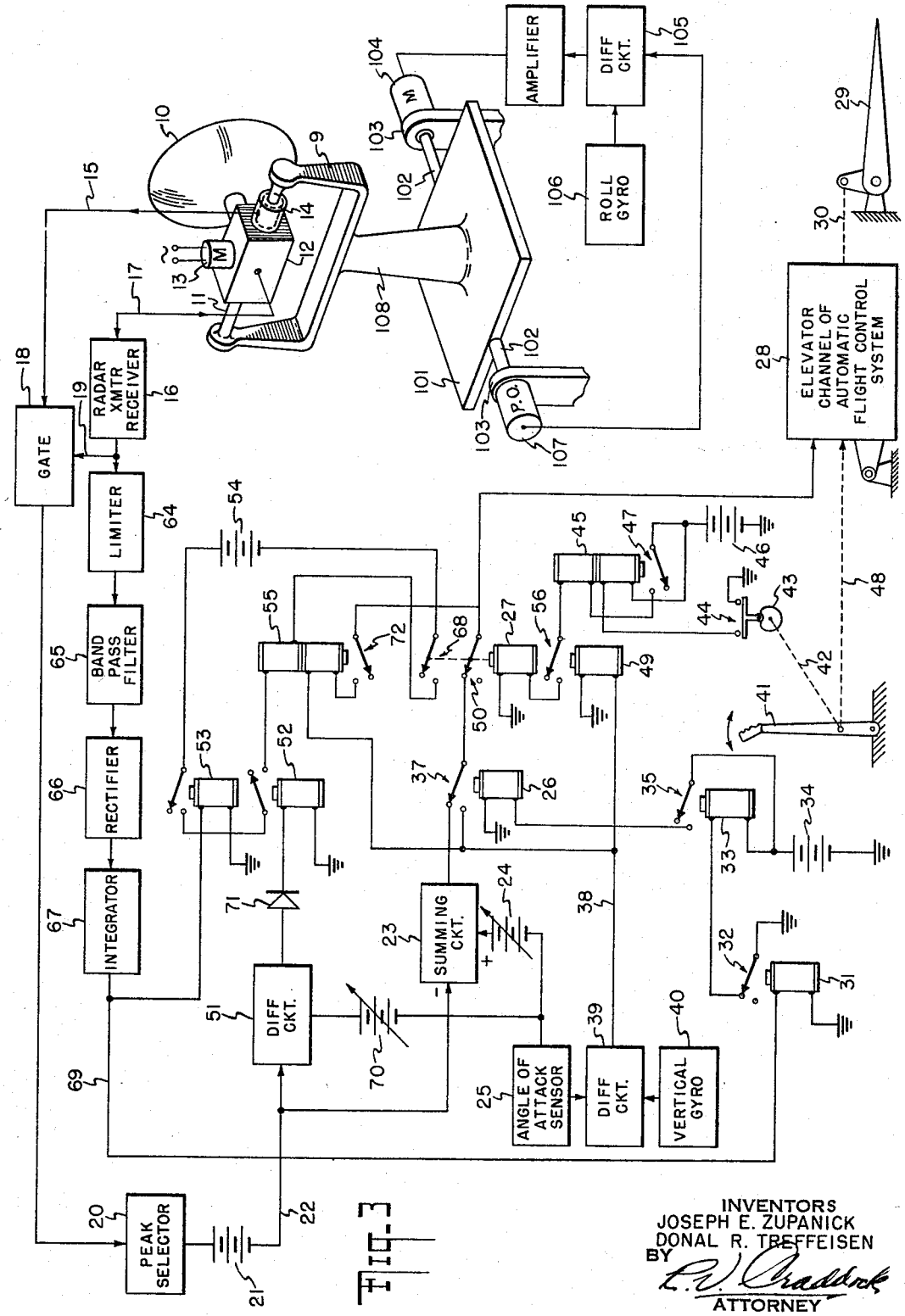

United States Patent Office 3,287,724
Patented Nov. 22, 1966

3,287,724
OBSTACLE CLEARANCE SYSTEM
FOR AIRCRAFT
Joseph E. Zupanick, Westbury, and Donal R. Treffeisen, Glen Cove, N.Y., assignors, by mesne assignments, to the United States of America as represented by the Secretary of the Air Force
Filed Oct. 24, 1957, Ser. No. 692,961
6 Claims. (Cl. 343—7)

The present invention relates to aircraft guidance systems and, more specifically, to such systems producing command signals for maneuvering an aircraft so as to avoid collision with obstacles.

Numerous systems have been proposed in the prior art as solutions to the problem of avoiding obstacles lying along the path of aircraft travel. Such prior art systems have been concerned primarily with the avoidance of obstacles with little attention, if any, being paid to the distance at which the obstacle is to be cleared.

Particularly in military situations, however, it is often desirable that the maneuvering aircraft be flown as close to the obstacle as is compatible with safety considerations. For example, it may be desirable for tactical reasons that the aircraft navigate between its point of origin and its destination while maintaining some minimum terrain clearance altitude for purposes of avoiding enemy radar detection. As is well understood in the radar art, the problem of airborne target detectability is greatly increased when the target aircraft is flown at low altitudes above the passing terrain.

One solution to the problem of clearing obstacles lying along the path of aircraft travel while maintaining minimum clearance altitudes is given in copending patent application U.S. Serial No. 672,537 filed on July 10, 1957, in the names of Donal R. Treffeisen and Joseph E. Zupanick. The invention of the aforementioned patent application contemplates the clearance of an obstacle by the execution of a maneuver which produces a selectable constant load factor on the maneuvering aircraft. By increasing the selectable load factor, the maximum maneuvering capability of the aircraft may be exploited to its fullest with the result that the aircraft is flown at a minimum clearance altitude at all times.

It may be seen that in the extreme case of demanding maximum maneuvering performance of the aircraft, physiological factors practically preclude the possibility that the aircraft be humanly piloted. Thus it is desirable that a compromise be made in order to make minimum clearance requirements compatible with the fact that repetitive, violent maneuvering is to be avoided.

Accordingly, it is a principal object of the present invention to provide an obstacle avoidance system for aircraft wherein provision is made for minimum clearance of obstacles lying along the path of aircraft travel while avoiding extreme accelerations on the moving aircraft.

An additional object is to provide an aircraft guidance system producing a command signal which is indicative of the angular displacement of the aircraft velocity vector from the peak of an oncoming obstacle.

A further object is to provide an aircraft guidance system whereby the aircraft is flown along a line lying above the peak of an oncoming obstacle by a predetermined angle.

Another object is to provide an aircraft guidance system providing for the commanded return of an aircraft to a horizontal line of flight subsequent to the clearing of an obstacle peak and in the absence of any further obstacles.

These and other objects of the present invention, as will appear more fully in the following specification, are achieved by the provision of apparatus including a computer adapted to receive radar data respecting an obstacle lying along the aircraft path of travel and aerodynamic data. From these data, the apparatus of the present invention operates to produce a command signal related to the deviation of the aircraft velocity vector from a line displaced from the peak of an oncoming obstacle by a predetermined angular amount.

The command signal information rate is determined by the elevation scanning rate of the radar carried on board the maneuvering aircraft. Provision is made for permanently referencing the radar antenna with respect to the longitudinal axis of the aircraft and for stabilizing the antenna about the roll axis of the aircraft.

As the aircraft is flown in conformance with the command signal, and the peak of the obstacle is ultimately passed, the airborne radar searches for the presence of additional obstacles lying along the flight path. In the absence of any such additional obstacles, the aircraft is controlled to fly along a horizontal line.

In the event that the pilot then decides to command a descending maneuver, the aircraft will be flown in response to the manual command of the pilot until subsequent obstacles are detected by the radar. The reappearance of radar video signals may indicate either the approach of relatively level terrain or the presence of a vertical obstacle. In either case, the apparatus of the present invention is operative to command the return of the aircraft to a horizontal flight path. Then, if the video signals persist and if the peak of the obstacle lies below the velocity vector of the aircraft by an amount less than the clearance angle or above the velocity vector, the aircraft is caused to ascend. On the other hand, if the video signals persist and if the obstacle peak lies below the velocity vector of the aircraft by an amount more than the clearance angle, the aircraft is caused to descend. In both cases, where the video signals still are present after the restoration to a horizontal line of flight, the aircraft is returned to automatic command for positioning the aircraft velocity vector along a line lying above the obstacle peak by a predetermined angular amount.

For a more complete understanding of the present invention, reference should be had to the following specification and to the appended drawings of which:

FIG. 1 shows the relationships between the angular data derived from the obstacle detection apparatus included in the present invention;

FIG. 2 illustrates a representative path which may be flown by an aircraft maneuvering in accordance with the present invention; and FIG. 3 is an illustrative automatic embodiment of the present invention.

Provision is made in the present invention for airborne detection apparatus such as, for example, radar. The radar includes antenna scanning means which is stabilized against only the roll of the aircraft. The radar antenna is caused to scan through angles both above and below the longitudinal axis of the aircraft. For example, the antenna may be caused to scan from 10° above the aircraft longitudinal axis (upper scan limit) to 10° below (lower scan limit). It is not necessary, however, that the upper and lower scan limits be equidistant from the aircraft longitudinal axis.

By reference to FIG. 1, it will be seen that the radar antenna thus scans through angles both above and below the velocity vector of the aircraft inasmuch as the angular displacement between the aircraft longitudinal axis and the aircraft velocity vector is generally substantially less than 10°. In FIG. 1, vector X represents the longitudinal or roll axis of the aircraft; vector V represents the velocity vector of the maneuvering aircraft which may lie below the longitudinal axis as indicated. The dotted lines respectively represent the upper and lower scan limits of the radar antenna. The angle $\sigma$ represents the deviation of the radar antenna axis from the longitudinal or X axis of the aircraft at an arbitrarily selected time during the antenna scan cycle. The angular relationships illustrated in FIG. 1 have been exaggerated for the sake of clarity.

As will be described in the following specification, means are provided to produce a signal proportional to the deviation of the radar antenna axis from the X axis of the aircraft, the signal being positive for obstacles lying above the X axis and negative for obstacles lying below the X axis.

The manner in which the present invention achieves its principal objective of obstacle clearance may be seen by reference to FIG. 2. It is assumed in FIG. 2 that the aircraft is approaching obstacle A along flight path P. It is further assumed that when the aircraft arrives at point 1, obstacle A comes within the maximum target detection range of the airborne radar. At this point a command signal is produced for maneuvering the aircraft in such a way that its velocity vector is oriented along a line displaced above the obstacle peak by a predetermined angular amount.

The relationship between the angles of interest during the execution of a pull-up maneuver for clearing obstacle A is shown at point 2. Line 3 represents the line-of-sight between the aircraft at point 2 and the peak of obstacle A. The angle $\sigma^p$ of the obstacle peak is measured between the aircraft X axis and line 3. The additional angles $\gamma$ and $\alpha$ are respectively measured between a horizontal line H and the velocity vector and between the velocity vector and the X axis of the aircraft.

The apparatus of the present invention operates to position the velocity vector of the aircraft along a line slightly above the line-of-sight 3 by satisfying the condition that $\sigma_p = \alpha + \eta_c$. The term $\eta_c$ represents a selectable clearance angle as measured between the velocity vector and the line-of-sight 3. If $\sigma_p$ is unequal to the sum of $\alpha + \eta^c$, the difference therebetween generates an error signal which is applied to the elevator channel of the aircraft automatic flight control system to position the aircraft elevator so as to eliminate the error.

This error elimination process continues as the aircraft proceeds along flight path P toward obstacle A. As a result, the aircraft will assume a horizontal line of flight at a short distance ahead of the peak of obstacle A, such as at point 4. The location of point 4, relative to the peak of obstacle A, depends upon the magnitude of $\eta_c$, point 4 being closer to the peak for smaller values of $\eta_c$.

Assuming that no further obstacles are detected by the aircraft radar upon arriving at point 4, the present invention provides for the slaving of the aircraft to a zero flight path angle whereby the horizontal dashed line 5 is flown. Should the pilot then decide to initiate a descending maneuver, the aircraft will be flown along dashed path 6 until an obstacle (in this case, the underlying terrain) is detected at an angle lying above the aircraft velocity vector.

When such a terrain obstacle is detected, a pull-up command signal is automatically applied to the elevator control system. In FIG. 2, it is assumed that the pull-up command signal is generated at point 7 along dashed path 6.

Following the initiation of the second pull-up maneuver at point 7, the aircraft is commanded to a zero flight path angle. As the aircraft continues along dashed path 6 and point 8 is reached, where obstacle B comes within the range of detection of the radar, a second summit clearance maneuver is initiated.

An illustrative automatic embodiment of the present invention for producing the sequence of aircraft maneuvers briefly described in connection with FIG. 2 is shown in FIG. 3. In FIG. 3, a radar antenna support base 101 is stabilized along the longitudinal axis (X axis) of the aircraft as by means of shaft 102 whose axis is fixed relative to the X axis of the aircraft by supports 103. Shaft 102 is rotated by motor 104 in response to the amplified output signal from difference circuit 105. Circuit 105 is adapted to substract a first input signal from a second input signal respectively derived from roll gyro 106 and pick-off 107. Pick-off 7 monitors the angular displacement of base 101 about the X axis of the aircraft. In this manner, base 101 is stabilized against aircraft roll.

Pesdestal 108 and yoke 9 together support shaft 11 which is rigidly affixed to yoke 9. A conventional antenna scanning mechanism 12 is positioned around and is caused to oscillate about shaft 11 by means of scanning motor 13. The relative displacement between the axis of scanning antenna 10 and the X axis of the aircraft is monitored by pick-off 14. Pick-off 14 produces an output signal on line 15 whose amplitude is a measure of the angular displacement of the axis of antenna 10 from the X axis of the aircraft.

Pick-off 14 is adapted to produce a zero output signal on line 15 when the axis of antenna 10 is positioned along the dotted line indicating the lower scan limit as shown in FIG. 1. The amplitude of the signal on line 15 accordingly increases, for example, in a positive direction as the axis of antenna 10 is caused to scan from the lower scan limit to the upper scan limit of FIG. 1.

Radar transmitter-receiver 16 is connected by microwave line 17 to scanning antenna 10. Transmitter-receiver 16 operates in a conventional manner to produce an output signal indicative of the presence of a radar target. In terms of the present invention, said output signal may represent an oncoming obstacle in the path of travel of the aircraft. A positive elevation angle signal, appearing on line 15, is connected to a first input to gate 18, a second input to which is obtained from the obstacle signal output of transmitter-receiver 16 appearing on line 19. An output is produced from gate 18 proportional to the amplitude of the signal appearing on line 15 at such times as obstacle signals appear on line 19. The output of gate 18 is applied to peak selector 20 which is applied to produce an output signal related to the maximum amplitude of the signals appearing at the output of gate 18. It will be recognized that the selected signal of maximum amplitude is representative of the elevation angle $\sigma_p$ of the peak of the obstacle detected.

Inasmuch as the elevation angle of interest in the present invention is measured between the X axis of the aircraft and the line-of-sight between the aircraft and the peak of an oncoming obstacle, bias means 21 is provided having a polarity such as will oppose the polarity of the signals at the output of peak selector 20. By reference to FIG. 1, it can be seen that when the signal at the output of selector 20 representing the angle $\sigma_p$ as measured from the lower scan limit to the obstacle line-of-sight, is reduced by a signal representing the reference angle, a signal proportional to the elevation angle $\sigma_p$ results.

The magnitude and sense of the elevation angle is represented by the amplitude and polarity of the signal appearing on line 22. The elevation angle signal on line 22 is applied to a first input to summing circuit 23, a second input to which is derived from the output of adjustable bias means 24. The resultant signal at the output of bias means 24 is equal to the sum of a first positive signal representing the angle-of-attack $\alpha$ and a second positive signal representing the clearance angle $\eta_c$. Adjustable bias means 24 produces the signal representing $\eta_c$, while the angle-of-attack signal is generated by angle-of-attack sensor 25. Bias means 24 and sensor 25 are serially connected with respect to the second input to summing circuit 23.

As was previously mentioned, the difference between the two signals respectively respresenting the elevation angle $\sigma_p$ and the sum of the angle of attack $\alpha$ and the clearance angle $\eta_c$ is applied to the elevator control system of the aircraft. Accordingly, the difference signal output from circuit 23 is connected via the normally closed contacts 37 and 50 of relays 26 and 27 to the electrical input of the elevator channel of flight control system 28 which, in turn, positions elevator 29 via mechanical linkage 30. It was previously pointed out that when the aforementioned difference signal is applied to the aircraft elevator control system, the aircraft automatically is maneuvered to satisfy the relationship that $\sigma_p = \alpha + \eta_c$. As a result, the aircraft velocity vector is positioned along the line deviating from peak of an oncoming obstacle by the clearance angle $\eta_c$.

The operation of the apparatus of FIG. 3 so far described relates to the aircraft maneuver for clearing the peak of obstacle A as illustrated in FIG. 2. When the aircraft passes the peak of obstacle A and no further obstacles are detected, video signals are no longer produced at the output of transmitter-receiver 16. It will be recalled that in such a case the apparatus of the present invention operates to slave the aircraft to a horizontal line of flight.

Limiter 64, band pass filter 65, rectifier 66, and integrator 67 are illustrative of a conventional arrangement for selectively detecting video signals at the output of transmitter-receiver 16 which occur at the radar repetition rate. The selective detection apparatus is operative to reject spurious signals which may be produced at the output of transmitter-receiver 16. Limiter 64 clips the peaks of the video signals at the output of transmitter-receiver 16 at a convenient level. The clipped signals, appearing at the output of limiter 64, are applied to the input of band pass filter 65 which is adapted to selectively pass those signals which occur substantially at the radar repetition rate and to reject signals of other repetition rates. The signals passed by filter 65 are rectified in rectifier 66 and summed in integrator 67. Integrator 67 is adapted to produce an output voltage of sufficient amplitude to energize relay 31 in the event that a predetermined number of video pulses at the radar repetition rate are produced at the output of transmitter-receiver 16.

In the assumed case where the peak of obstacle A is traversed and no further obstacles are detected, no signal appears on line 69 at the output of integrator 67. Thus, relay 31 is de-energized causing its contacts 32 to assume their de-actuated position as shown in FIG. 3. With the de-actuation of contacts 32, time delay relay 33 tends to become energized. Relay 33 becomes energized, i.e., is finally operated, only in the case that relay 31 remains de-energized for a period of time corresponding approximately to the period of one elevation scan cycle of antenna 10. Normally, the loss of obstacle signals in such a period is an indication that no further obstacles are present whose peaks lie above the lower scan limit of antenna 10 as shown in FIG. 1. In such a case, time delay relay 33 becomes energized in turn causing the energization of relay 26 via a continuous conductive path provided through ground by D.C. source 34, actuated contacts 35 of relay 33, and the control coil of relay 26.

Upon the operation of relay 26, its normally closed contacts 37 assume their actuated position, disrupting the application of the signal at the output of circuit 23 to the electrical input of elevator control system 28. Instead, a signal appearing on line 38, proportional to the aircraft flight path angle $\gamma$, is applied to the electrical input of elevator control system 28. The signal representing $\gamma$ is produce at the output of difference circuit 39 which is adapted to subtract a signal representing angle-of-attack (generated by the angle-of-attack sensor 25) from a signal representing pitch angle (generated by vertical gyro 40).

Upon the application of the flight path angle signal to the elevator control system 28, via the actuated contacts 37 of relay 26, elevator 29 is automatically positioned to reduce the flight path angle signal to zero. As a result, the velocity vector of the aircraft is positioned along a horizontal line. Thus, when the peak of obstacle A of FIG. 2 is cleared and no further obstacles are detected, the aircraft is automatically commanded to fly along a horizontal line.

Provision is made in the apparatus of the present invention for manual control of the aircraft by the pilot at any time. For purposes of illustration, let it be assumed that the pilot decides to initiate a descending maneuver after the aircraft has been slaved to a horizontal flight path. The descending maneuver is commanded by displacement of control stick 41 in turn imparting a rotary motion via mechanical linkage 42 to cam 43. The rotation of cam 43 causes the normally open contacts of switch 44 to close energizing the control coil of relay 45 by means of D.C. source 46. Upon the energization of the control coil of relay 45, its normally open contacts 47 are closed to assume their actuated positions (opposite to that shown).

In the presence of a flight path angle $\gamma$ signal other than O, relay 49 is energized. Upon the concurrence of the energization of relay 49 (and the closure of its normally open contacts 56) and the actuation of contacts 47, relay 27 is energized. Upon the energization of relay 27, its associated contacts 50 and 68 assume their actuated position (opposite to that shown in FIG. 3). The actuation of contacts 50 disconnects the difference signal output from circuit 39 from the electrical signal input to the elevator control system 28. In consequence, the aircraft is flown solely in compliance with the manual maneuver signal imparted via mechanical linkage 48 to elevator control system 28.

In terms of FIG. 2, the aircraft is now being flown along dotted path 6 toward point 7. It will be recalled that the terrain was assumed to come within the maximum detection range of the radar system when the aircraft reaches point 7. Therefore, at point 7, obstacle signals begin to reappear on line 69 and a signal corresponding to $\sigma_p$ of FIG. 1 reappears on line 22.

Provision is made for the automatic return of the aircraft to a zero flight path angle in the event that the relationship $\sigma_p \geq \alpha + \eta_p$ is satisfied during the execution of a descending maneuver. To achieve such a result, difference circuit 51 is connected to receive and operative to subtract a signal corresponding to the sum of $\alpha + \eta_p$ from a signal corresponding to angle $\sigma_p$. $\eta_p$ is a selectable clearance angle which may be given a value independent of the value of $\eta_c$. A signal representing $\eta_p$ is provided by variable bias means 70. There is thus produced at the output of circuit 51 a positive signal in the event that $\sigma_p \geq \alpha + \eta_p$. Such a positive signal is passed by diode 71 and energizes the control coil of relay 52.

In the assumed presence of obstacle video signals on line 69, relay 53 is also energized, thus providing a continuous conductive path via the closed contacts of relays 52 and 53, D.C. source 54, and actuated contacts 68 for the energizing of the control coil of relay 55. Upon the actuation (closure) of contacts 72, the signal on line 38 (representing the flight path angle $\gamma$) is connected to the electrical input of the elevator control system 28 through the holding coil of relay 55. As before, elevator 29 is positioned to reduce the flight path angle $\gamma$ signal to zero whereupon the aircraft velocity vector is commanded to return to a horizontal line.

Upon the establishment of a zero flight path angle, relay 49 and the hold coil of relay 55 are both de-energized. When relay 49 is de-energized, the return of its associated contacts 56 to their open position (as shown) disrupts the circuit energizing relay 27 and the hold coil of relay 45, returning the respectively associated contacts 50, 68, and 47 to their initial position.

Returning to FIG. 2, it can be seen that the aircraft is now being flown along a horizontal line between points 7 and 8. When the aircraft arrives at point 8 and obstacle B comes within the maximum detection range of the airborne radar, the initial pull-up cycle of operation will be repeated, with the difference signal output from circuit 23 being applied via the de-actuated contacts 37 and 50.

As described in the preceding specification, the objects of the present invention have been fulfilled by the provision of means adapted to receive aerodynamic data and data respecting the presence and angular orientation (relative to the X-axis of the aircraft) of an oncoming obstacle along the path of travel. From these data, a command signal is produced which when applied to the elevator control system of the aircraft causes the aircraft to be flown along the line deviating from the peak of an oncoming obstacle by a predetermined angular amount. When the peak of the oncoming obstacle has been safely traversed and no further obstacles are detected, the aircraft is automatically commanded to a zero flight path angle.

Provision is made for manual control of the aircraft by the pilot at any time. Following the initiation of a manually instituted descending maneuver, the apparatus of the present invention in on the alert to detect the presence of the terrain below. When the maximum elevation angle of said terrain, for which a radar video signal is present, exceeds the sum of the angle of attack plus a selectable predetermined amount $\eta_p$ the aircraft is automatically commanded to fly a zero flight path angle.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. In an aircraft guidance system, apparatus including means for detecting the presence and angular orientation of an obstacle lying along the path of aircraft travel, said means for detecting producing first and second signals, said first signal when produced being indicative of the presence of an obstacle, and said second signal when produced being proportional to the angular deviation of the longitudinal axis of the aircraft from the line-of-sight between said aircraft and the peak of said obstacle, means for producing a reference signal, means for generating a third signal proportional to the aircraft angle-of-attack, means for comparing said second signal with the sum of said reference and third signal to produce a fourth signal proportional to the difference between said second signal and said signal sum, means having a control input for positioning a control surface of said aircraft, and means for selectively applying said fourth signal to said control input, said means for selectively applying being adapted to receive said first signal and said fourth signal and being operative to apply said fourth signal to said control input in the presence of said first signal.

2. In an aircraft guidance system, apparatus including means for detecting the presence and angular orientation of an obstacle lying along the path of aircraft travel, said means for detecting producing first and second signals, said first signal when produced being indicative of the presence of an obstacle and said second signal when produced being proportional to the angular deviation of the longitudinal axis of the aircraft from the line-of-sight between said aircraft and the peak of said obstacle, means for producing a reference signal, means for generating a third signal proportional to the aircraft angle-of-attack, means for comparing said second signal with the sum of said reference and third signal to produce a fourth signal proportional to the difference between said second signal and said signal sum, means having a control input for positioning a control surface of said aircraft, means for generating a fifth signal proportional to the aircraft flight path angle, and means for selectively applying said fourth signal and said fifth signal to said control input, said means for selectively applying being adapted to receive said first, fourth, and fifth signals and being operative to apply said fourth signal to said control input in the presence of said first signal, and to apply said fifth signal to said control input in the absence of said first signal.

3. In an aircraft guidance system for clearing an obstacle lying along the path of aircraft travel, apparatus including radar data means for generating first and second signals, said first signal being indicative of the presence of an obstacle and said second signal being proportional to the angular deviation of the longitudinal axis of the aircraft from the line-of-sight between said aircraft and the peak of said obstacle, computer means adapted to receive said second signal and a third signal representing aerodynamic data and operative to compute therefrom the deviation of the aircraft velocity vector from a line displaced from the peak of said obstacle by a predetermined angular amount, said computer producing a fourth signal proportional to said computed deviation, means having a control input for positioning a control surface of said aircraft, and means for selectively applying said fourth signal to said control input in the presence of said first signal.

4. In an aircraft guidance system apparatus including a computer adapted to receive radar data respecting an obstacle lying along the path of aircraft travel and aerodynamic data and operative to compute therefrom the deviation of the aircraft velocity vector from a line displaced from the peak of said obstacle by a predetermined angular amount, said computer producing a signal proportional to said computed deviation, dual input means for positioning a control surface of said aircraft, selectable means for applying said signal to one of said dual inputs, and actuatable means operatively connected to said selectable means for energizing the other of said dual inputs, said selectable means being operative to disconnect said signal from said one of said dual inputs upon the actuation of said energizing means.

5. In an aircraft guidance system for clearing an obstacle lying along the path of aircraft travel, apparatus including a computer adapted to receive radar data respecting said obstacle and aerodynamic data and operative to compute therefrom the deviation of the aircraft velocity vector from a line displaced from the peak of said obstacle by a predetermined angular amount, said computer producing a first signal proportional to said computed deviation, means for generating a second signal proportional to the aircraft flight path angle, dual input means for positioning a control surface of said aircraft, selectable means for applying said first signal and said second signal to one of said dual inputs, and actuatable means operatively connected to said selectable means for energizing the other of said dual inputs, said selectable means being adapted to receive said first and said second signals and operative when said energizing means is actuated in the presence of said second signal to disconnect said first signal from said one of said dual inputs.

6. In an aircraft guidance system for clearing an obstacle lying along the path of aircraft travel, apparatus including a computer adapted to receive radar data respecting said obstacle and aerodynamic data and operative to compute therefrom the deviation of the aircraft velocity vector from a line displaced from the peak of said obstacle by a predetermined angular amount, said computer producing a first signal proportional to said computed deviation, means for generating a second signal proportional to the aircraft flight path angle, dual input means for positioning a control surface of said aircraft, selectable means for applying said first signal and said second signal to one of said dual inputs, and actuatable means operatively connected to said selectable means for energizing the other of said dual inputs, said selectable means being adapted to receive said first and said second signals and operative when said energizing means is actuated in the presence of said second signal to apply said second signal to said one of said dual inputs.

References Cited by the Examiner

UNITED STATES PATENTS 2,630,283   3/1953   Hanson _____ 244—77

CHESTER L. JUSTUS, *Primary Examiner.*

NORMAN H. EVANS, FREDERICK M. STRADER,
*Examiners.*

M. A. MORRISON, P. M. HINDERSTEIN,
*Assistant Examiners.*